(12) United States Patent
Chen et al.

(10) Patent No.: US 7,688,750 B2
(45) Date of Patent: Mar. 30, 2010

(54) METHOD FOR DETECTING TRANSMISSION QUALITY

(75) Inventors: Shu-Yi Chen, Taipei (TW); Chang-Hung Lee, Yuan Lin Hsien (TW)

(73) Assignee: Qisda Corporation, Taoyuan County (TW)

( * ) Notice: Subject to any disclaimer, the term of this patent is extended or adjusted under 35 U.S.C. 154(b) by 476 days.

(21) Appl. No.: 11/656,850

(22) Filed: Jan. 23, 2007

(65) Prior Publication Data

US 2007/0195819 A1    Aug. 23, 2007

(30) Foreign Application Priority Data

Feb. 14, 2006    (TW) ............... 95104937 A

(51) Int. Cl.
*H04J 1/00* (2006.01)
*H04J 3/16* (2006.01)

(52) U.S. Cl. ...................... 370/252; 370/465

(58) Field of Classification Search ............... 370/252, 370/465
See application file for complete search history.

(56) References Cited

U.S. PATENT DOCUMENTS

| | | | |
|---|---|---|---|
| 7,313,737 B2 * | 12/2007 | Gronberg et al. ............ | 714/704 |
| 2004/0184482 A1 * | 9/2004 | Gronberg et al. ............ | 370/477 |
| 2005/0163070 A1 * | 7/2005 | Farnham et al. ............. | 370/328 |
| 2006/0019679 A1 * | 1/2006 | Rappaport et al. ........ | 455/456.5 |
| 2006/0034233 A1 * | 2/2006 | Strutt et al. ................. | 370/338 |
| 2006/0067418 A1 * | 3/2006 | Girardeau et al. ........... | 375/265 |
| 2006/0165006 A1 * | 7/2006 | Kelz ........................... | 370/252 |
| 2007/0115899 A1 * | 5/2007 | Ovadia et al. ............... | 370/338 |
| 2007/0116007 A1 * | 5/2007 | Xiao et al. ................. | 370/395.4 |

* cited by examiner

*Primary Examiner*—Andrew Lee

(57) ABSTRACT

A method for detecting transmission quality is provided. The method includes following steps. First, the second electronic apparatus receives several data packets through a wireless channel. The data packets are sent by the first electronic apparatus. Next, the second electronic apparatus obtains a received signal strength indication and a bit error rate according to the data packets, Then, the second electronic apparatus determines an effective bandwidth according to the received signal strength indication and bit error rate. Afterwards, the second electronic apparatus determines a signal quality index according to the effective bandwidth and a packet delay rate. Therefore, a user of the second electronic apparatus is able to know a connecting status of a wireless media product.

19 Claims, 1 Drawing Sheet

$RSSI_1 > RSSI_{th} > RSSI_2$

METHOD FOR DETECTING TRANSMISSION QUALITY

BACKGROUND OF THE INVENTION (1) Field of the Invention

The present invention generally relates to a method for a transmission quality, and particularly to the method for detecting the transmission quality between two electronic apparatus.

(2) Description of the Prior Art

Recently, the wireless network is used more and more commonly due to maturely-developed wireless technology. In the beginning, the wireless technology is applied to an information technology (IT) apparatus. Through the IT apparatus, a wireless LAN card and a wireless base station, a user is able to connect to the internet and obtain the needed information.

Flourishing development of the wireless network enables people to obtain the information anywhere and anytime without limitations. The application of wireless network is diversified and full of originality. The wireless network is able to be applied to any aspect of people's lives and also enrich them. Moreover, devices with wireless audio/video function are invented successively in the recent years. As a result, more wireless apparatuses, such as a media gateway, a personal media player (PMP), a personal digital assistant (PDA) and a smart phone, are developed as well.

In a general wireless media device, the transmission speed has to attain a specific value, such as 4 Mbps, to display the real-time video/audio data smoothly. However, the transmission of video/audio data are often interfered, and the data error rate is increased. As a result, the data need to be resent, or more error-correcting codes need to be added. Therefore, the transmission speed is not able to attain the specific value. As to general data, the wireless electronic device can still receive the correct data when the data transmission is interfered. However, as to the audio/video data, when the transmission speed does not attain the specific value, some frames are not transmitted immediately and then are discarded by the decoder. As a result, the image is delayed or even interrupted.

SUMMARY OF THE INVENTION

An objective of the present invention is to provide a method for detecting a transmission quality to indicate the connecting status of a wireless media product in transmitting media signals. A user is able to make an adjustment when using the wireless media product according to a signal quality index. For example, the user can relocate the wireless media product, adjust the transmission distance, or check if there is any interference signal in the environment.

To achieve the above objective, the method for detecting the transmission quality is provided by the invention. The method includes following steps. First, the first electronic apparatus transmits several data packets to the second electronic apparatus through a wireless channel. Next, the second electronic apparatus detects a received signal strength indication (RSSI) and a bit error rate (BER) of the first electronic apparatus in transmitting the data packets. Then, the second electronic apparatus determines an effective bandwidth according to the received signal strength indication and the bit error rate. Afterwards, the transmission quality between the first electronic apparatus and the second electronic apparatus is determined to be suitable for transmitting the data packets when a required bandwidth is less than the effective bandwidth and a packet delay rate is less than a predetermined value.

According to a preferable embodiment of the invention, the effective bandwidth is selectively the first bandwidth or the second bandwidth. The first bandwidth is greater than the second bandwidth.

According to a preferable embodiment of the invention, when the received signal strength indication is greater than a predetermined strength, the effective bandwidth is increased. When the received signal strength indication is less than the predetermined strength, the effective bandwidth is decreased.

According to a preferable embodiment of the invention, when the bit error rate is less than a predetermined value, the effective bandwidth is increased. When the bit error rate is greater than the predetermined value, the effective bandwidth is decreased.

According to a preferable embodiment of the invention, the first data packet is transmitted by the first electronic apparatus. When the first electronic apparatus does not receive a confirmation from the second electronic apparatus in a predetermined time period, the first electronic apparatus resends the first data packet. The first electronic apparatus determines the packet delay rate according to a number of resending.

According to a preferable embodiment of the invention, the first electronic apparatus sends the first data packet with a time stamp when sending the first data packet. When the second electronic apparatus receives the first data packet and the time stamp exceeds a predetermined value, the second electronic apparatus ignores the first data packet. The second electronic apparatus determines the packet delay rate according to the number of ignoring.

These and other objectives of the present invention will no doubt become obvious to those of ordinary skill in the art after reading the following detailed description of the preferred embodiment which is illustrated in the various figures and drawings.

BRIEF DESCRIPTION OF THE DRAWINGS

The present invention will now be specified with reference to its preferred embodiment illustrated in the drawings, in which.

DESCRIPTION OF THE PREFERRED EMBODIMENT

Figure 1:
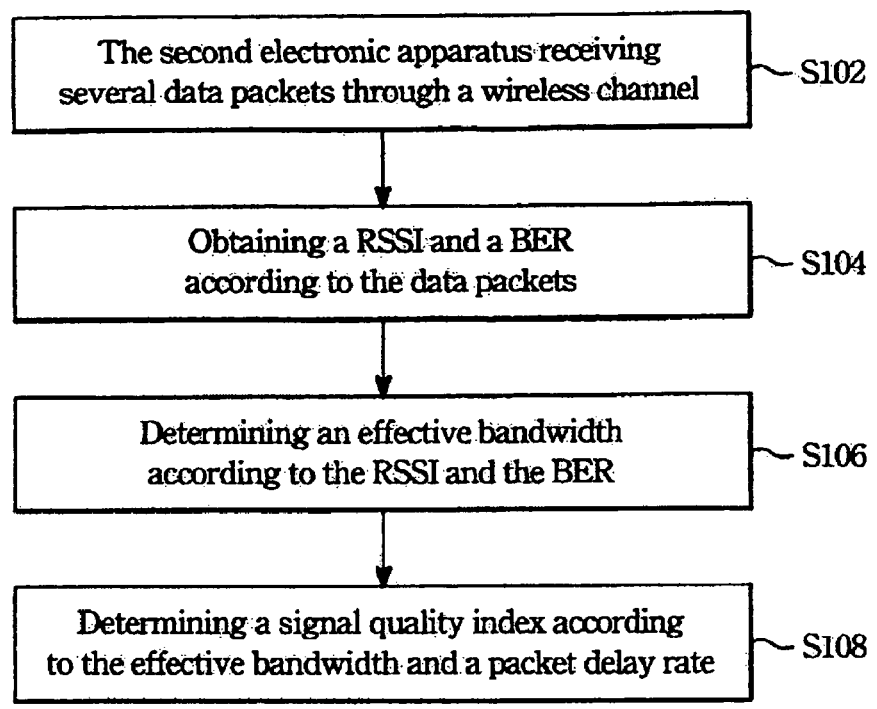
FIG. 1 illustrates a method for detecting transmission quality according to the invention.

Please refer to FIG. 1. FIG. 1 illustrates a method for detecting transmission quality according to the invention. The method is used for detecting the wireless transmission quality between the first electronic apparatus and the second electronic apparatus.

In the present embodiment, the method includes following steps. First, the second electronic apparatus receives several data packets through a wireless channel. The data packets are sent by the first electronic apparatus. A required bandwidth is set by the first electronic apparatus. For example, when the data packets are real-time image data, the required bandwidth is 4 Mbps. The effective bandwidth has to be at least 4 Mbps to receive the image data (S102).

Next, the second electronic apparatus obtains a received signal strength indication (RSSI) and a bit error rate (BER) according to the data packets sent by the first electronic apparatus (S104).

The RSSI is a strength index of RF signals according to the average strength in a predetermined time period. The second electronic apparatus obtains the received signal strength indication according to the signals sent by the first electronic apparatus. When the received signal strength indication is higher, the RF signals are more intense.

Furthermore, a packet error rate (PER) can also represent the bit error rate. The packet error rate shows the number of received error packets, not including the resent packets. In general, when the packet error rate is greater than 8%, the transmitted signal quality is not acceptable in the real-time signals.

Then, after step S104, the second electronic apparatus determines an effective bandwidth according to the received signal strength indication and the bit error rate (S106). In 802.11b, the theoretical value of the transmission bandwidth is 11 Mbps. However, even in the ideal condition, the effective bandwidth is about 5.5 Mbps. When the received signal strength indication is weak or the interference increases, the effective bandwidth in a receiving terminal changes according to the received signal strength indication and the bit error rate. Lowering the effective bandwidth decreases the probability of losing data. Therefore, take the second electronic apparatus for example. When the received signal strength indication is less than the predetermined strength, the effective bandwidth is increased to 2 Mbps from 5.5 Mbps. When the received signal strength indication is greater than the predetermined strength, the effective bandwidth is increased to 5.5 Mbps from 2 Mbps for increasing the transmission speed. When the effective bandwidth is decreased or increased, the adjusting level and the number of steps are determined according to the design of the system. Moreover, the similar mechanism is also in the bit error rate and the received signal strength indication. When the bit error rate is less than a predetermined value, the effective bandwidth is increased. When the bit error rate is greater than the predetermined value, the effective bandwidth is decreased. Therefore, the effective bandwidth is determined according to the received signal strength indication and the bit error rate in the present embodiment.

Figure 2:
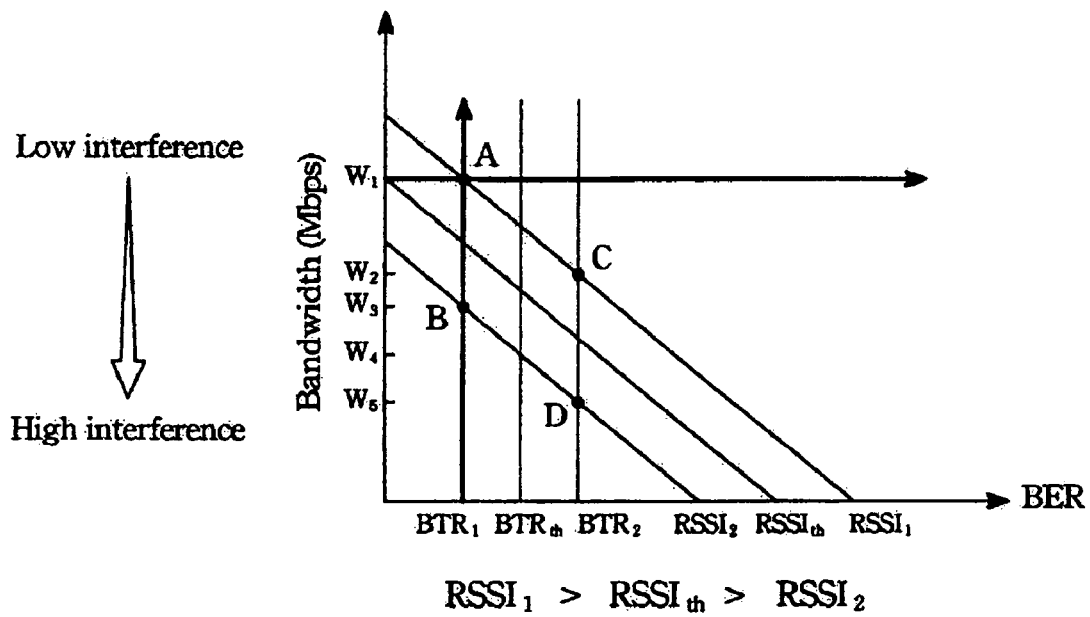
FIG. 2 illustrates the relation between the signal quality and the bandwidth according to the invention.

Please refer to FIG. 2 and the following table 1. FIG. 2 illustrates the relation between the signal quality and the bandwidth according to the invention. Table 1 illustrates the comparison between the interference and the received signal strength indication.

TABLE 1

| when the first electronic apparatus transmits 5.5 Mbps data to the second electronic apparatus | intense received signal strength indication | weak received signal strength indication I |
|---|---|---|
| low interference | (1) the data amount received by the second electronic apparatus is close to 5.5 Mbps, and the packet error rate is low (good signal quality) | (3) the received signal strength indication is less than the predetermined strength, and the wireless LAN card is lowered to 2 Mbps automatically. The data amount received by the second electronic apparatus is close to 2 Mbps, and the packet error rate is low. The signal quality is better than condition (2). |
| high interference | (2) the data amount received by the second electronic apparatus is different according to the interference. When the bit error rate is greater than the predetermined value, the wireless LAN card lowers the speed automatically for decreasing the packet error rate. | (4) the data amount received by the second electronic apparatus is different according to the interference. The packet error rate is high, and the signal quality is poor. The internet is even not able to connected to. |

Take point A in FIG. 2 for example. In the condition (1), the distance between the first electronic apparatus and the second electronic apparatus is short. The interference is low, so the number of resending is relatively less.

In the condition (2), the distance between the first electronic apparatus and the second electronic apparatus is short. The interference is high, so a number of resending is relatively more. When the bit error rate is greater than the predetermined value, the wireless LAN card lowers the speed automatically.

In the condition (3), the distance between the first electronic apparatus and the second electronic apparatus is far. The interference is less but more than the interference in the condition (1). Therefore, when the received signal strength indication is less than the predetermined strength, the wireless LAN card lowers the speed automatically to decrease the number of resending.

In the condition (4), the distance between the first electronic apparatus and the second electronic apparatus is far. The interference is high. Therefore, the number of resending is relatively high. When the received signal strength indication is less than the predetermined strength, the wireless LAN card lowers the speed automatically.

Please continuously refer to FIG. 2. In FIG. 2, $RSSI_1$ is greater than (received signal strength indication)$_{th}$, and (received signal strength indication)$_{th}$ is greater than (received signal strength indication)$_2$. For example, when the received signal strength indication is equal to (received signal strength indication)$_1$, the bandwidth is adjusted as the inclined line in FIG. 2. Meanwhile, when the bit error rate is equal to BTR1, the effective bandwidth is the same as point A (W1=5.5 Mbps). In the same time, when the received signal strength indication changes to (received signal strength indication)$_2$ (less than (received signal strength indication)$_{th}$), the effective bandwidth is decreased to point B (W3). Also, when the bit error rate is increased to BTR$_{th}$, the effective bandwidth is decreased to point D (W5). Therefore, the environmental interference and the received signal strength indication are the main factors in determining the effective bandwidth.

After the effective bandwidth is determined, the second electronic apparatus determines if the transmission quality is acceptable or not. When the required bandwidth (W4) is less than the effective bandwidth and the packet delay rate is less than a predetermined value, the transmission quality is acceptable (S108). When the received signal strength indication is greater than a predetermined strength, the effective bandwidth is increased. When the received signal strength indication is less than the predetermined strength, the effective bandwidth is decreased.

In the present embodiment, when the bit error rate is less than a predetermined value, the effective bandwidth is increased. When the bit error rate is greater than the predetermined value, the effective bandwidth is decreased.

In a preferable embodiment of the invention, the first electronic apparatus sends the first data packet. When the first electronic apparatus does not receive a confirmation from the second electronic apparatus for the first data packet in a predetermined time period, the first electronic apparatus resends the first data packet. The first electronic apparatus determines the packet delay rate according to the number of resending. Besides, the packet delay rate is determined by using at least one data packet sent to the second electronic apparatus.

When the first electronic apparatus sends the first data packet, the first data packet is sent with a time stamp. When the second electronic apparatus receives the first data packet and the time stamp exceeds a predetermined value, the second electronic apparatus ignores the first data packet. The second electronic apparatus determines the packet delay rate according to the number of ignoring.

In the present embodiment, the required bandwidth is used for transmitting at least one data packet to the second electronic apparatus. When the required bandwidth is greater than effective bandwidth or when the packet delay rate is greater than the predetermined value, the transmission quality between the first electronic apparatus and the second electronic apparatus is considered unsuitable for transmitting data packets. Also, when the transmission quality between the first electronic apparatus and the second electronic apparatus is unsuitable for transmitting the data packets, the second electronic apparatus sends an alarm packet to the first electronic apparatus. Then, the first electronic apparatus selectively increases a transmission power and decreases the required bandwidth according to the alarm packet.

In a preferable embodiment of the invention, the data packets are real-time data, such as media data. Besides, the required bandwidth is relative to the resolution of image data.

In a preferable embodiment of the invention, the second electronic apparatus further includes an indicating device. The indicating device is used for indicating if the transmission quality between the first electronic apparatus and the second electronic apparatus is suitable for transmitting real-time data.

As stated above, the method for detecting transmission quality of the invention not only refers to the received signal strength indication and the bit error rate but also refers to the transmission speed and the packet delay rate. As a result, the user of the second electronic apparatus is able to know the real connection status of the wireless media product.

With the example and explanations above, the features and spirits of the invention are hopefully well described. Those skilled in the art will readily observe that numerous modifications and alterations of the device may be made while retaining the teaching of the invention. Accordingly, the above disclosure should be construed as limited only by the metes and bounds of the appended claims.

We claim:

1. A method for detecting a transmission quality between a first electronic apparatus and a second electronic apparatus, the method comprising:
   the second electronic apparatus receiving a plurality of data packets through a wireless channel, the data packets sent by the first electronic apparatus, the first electronic apparatus setting a required bandwidth;
   the second electronic apparatus obtaining a received signal strength indication and a bit error rate according to the data packets;
   the second electronic apparatus determining an effective bandwidth according to the received signal strength indication and the bit error rate; and
   determining the transmission quality when the required bandwidth is less than the effective bandwidth and a packet delay rate is less than a predetermined value.

2. The method of claim 1, wherein the effective bandwidth is increased when the received signal strength indication is greater than a predetermined strength; the effective bandwidth decreased when the received signal strength indication less than the predetermined strength.

3. The method of claim 1, wherein the effective bandwidth is increased when the bit error rate is less than a predetermined value; the effective bandwidth decreased when the bit error rate is greater than the predetermined value.

4. The method of claim 1, wherein the first electronic apparatus sends a first data packet to the second electronic apparatus; when the first electronic apparatus not receiving a confirmation of receiving the first data packet from the second electronic apparatus in a predetermined time period, the first electronic apparatus resending the first data packet; the first electronic apparatus determining the packet delay rate according to a number of resending.

5. The method of claim 4, wherein the packet delay rate is determined by using at least one data packet transmitted to the second electronic apparatus.

6. The method of claim 1, wherein the required bandwidth is set by using at least one data packet transmitted to the second electronic apparatus.

7. The method of claim 1, wherein the transmission quality between the first electronic apparatus and the second electronic apparatus is not suitable for transmitting the data packets when the required bandwidth is greater than the effective bandwidth or the packet delay rate is greater than the predetermined value.

8. The method of claim 7, wherein the second electronic apparatus sends an alarm packet to the first electronic apparatus when the transmission quality between the first electronic apparatus and the second electronic apparatus is not suitable for transmitting the data packets.

9. The method of claim 8, wherein the first electronic apparatus selectively increases transmission power or decreases the required bandwidth according to the alarm packet.

10. The method of claim 1, wherein the data packets are real-time data.

11. The method of claim 10, wherein the second electronic apparatus further comprises an indicating device used for indicating if the transmission quality between the first electronic apparatus and the second electronic apparatus is suitable for transmitting the real-time data.

12. The method of claim 10, wherein the real-time data are image data, the required bandwidth corresponding to the resolution of the image data.

13. A method for detecting a transmission quality between a first electronic apparatus and a second electronic apparatus, the method comprising:
   the second electronic apparatus receiving a plurality of data packets through a wireless channel, the data packets sent by the first electronic apparatus, the first electronic apparatus setting a required bandwidth;
   the second electronic apparatus obtaining a received signal strength indication and a bit error rate according to the data packets;
   the second electronic apparatus determining an effective bandwidth according to the received signal strength indication and the bit error rate; and
   determining the transmission quality when the required bandwidth is less than the effective bandwidth and a packet delay rate is less than a predetermined value,
   wherein the first electronic apparatus sends a first data packet with a time stamp, in response to the second electronic apparatus receiving the first data packet and the time stamp exceeding a predetermined value, the second electronic apparatus ignores the first data packet and determines the packet delay rate according to a number of ignoring.

14. The method of claim 13, wherein the effective bandwidth is increased when the received signal strength indication is greater than a predetermined strength; the effective bandwidth decreased when the received signal strength indication less than the predetermined strength.

15. The method of claim 13, wherein the effective bandwidth is increased when the bit error rate is less than a predetermined value; the effective bandwidth decreased when the bit error rate is greater than the predetermined value.

16. The method of claim 13, wherein the first electronic apparatus sends a first data packet to the second electronic apparatus; when the first electronic apparatus not receiving a confirmation of receiving the first data packet from the second electronic apparatus in a predetermined time period, the first electronic apparatus resending the first data packet; the first electronic apparatus determining the packet delay rate according to a number of resending.

17. The method of claim 16, wherein the packet delay rate is determined by using at least one data packet transmitted to the second electronic apparatus.

18. The method of claim 13, wherein the transmission quality between the first electronic apparatus and the second electronic apparatus is not suitable for transmitting the data packets when the required bandwidth is greater than the effective bandwidth or the packet delay rate is greater than the predetermined value.

19. A method for detecting a transmission quality between a first electronic apparatus and a second electronic apparatus, the method comprising:
   the second electronic apparatus receiving a plurality of data packets through a wireless channel, the data packets sent by the first electronic apparatus, the first electronic apparatus setting a required bandwidth corresponding to a resolution of an audio/video image data;
   the second electronic apparatus obtaining a received signal strength indication and a bit error rate according to the data packets;
   the second electronic apparatus determining an effective bandwidth according to the received signal strength indication and the bit error rate; and
   determining the transmission quality suitable for transmitting the audio/video image data when the required bandwidth is less than the effective bandwidth and a packet delay rate is less than a predetermined value.

* * * * *